Sept. 24, 1963 C. D. CORY, JR., ETAL 3,105,119

HIGHWAY COMMUNICATION SYSTEM

Filed April 7, 1960 2 Sheets-Sheet 1

INVENTORS
Carleton D. Cory, Jr.,
BY & Richard L. Jenkins
Paul J. Elkington
ATTORNEY INVENTORS
Carleton D. Cory, Jr.,
BY & Richard L. Jenkins
Paul J. Ethington
ATTORNEY United States Patent Office 3,105,119
Patented Sept. 24, 1963

3,105,119

HIGHWAY COMMUNICATION SYSTEM

Carleton D. Cory, Jr., and Richard L. Jenkins, Kokomo, Ind., assignors to General Motors Corporation, Detroit, Mich., a corporation of Delaware Filed Apr. 7, 1960, Ser. No. 20,746
3 Claims. (Cl. 179—82)

This invention relates to a communication system and more particularly to a system for conveying information to moving vehicles.

If an audible message could be transmitted to moving vehicles as they pass a given point on a highway, then the drivers of these vehicles could be informed of various road and traffic conditions without taking their eyes off the road to read signs. A radio transmission system is a practical means of transmitting a voice signal to a moving vehicle but such a system must avoid interfering with other radio services since the radio frequency spectrum is already crowded. Since it may be desirable to transmit many different messages in a relatively small area such as that surrounding a major interchange of an expressway, the radio transmission must be of very limited range to avoid cross-talk between separate units of the system. On the other hand, the radiated power must be of a sufficient level such that a simple and low cost vehicle-mounted receiver would be adequate. Also, a practical system would have to be installed easily in existing roadways and vehicles. Further, while a message is being transmitted to vehicles traveling in one direction it would be undesirable for vehicles going the opposite direction to receive the same message.

A low frequency system meeting these requirements and adapted for transmitting information to vehicles moving in one direction only is disclosed in the co-pending application S.N. 6,055, filed February 1, 1960 which is assigned to the assignee of the present invention.

It is the principal object of this invention to provide an improved system for transmitting information to moving vehicles. Another object of this invention is to provide an improved system for transmitting information to vehicles moving in one direction while vehicles moving in the opposite direction do not receive this information. A further object is to provide unidirectional triggering in a communication system wherein the triggering signal is displaced in frequency from the information signal.

In accordance with this invention, message transmitting means are provided adjacent a roadway so that radio transmission to a passing vehicle will be effective for a period of time adequate to convey a desired message. Along the roadway prior to the message transmitting means, there is provided a trigger transmitter which produces a signal having a frequency outside the band of message transmission. This trigger signal is effective to energize the receiver in a passing vehicle before it enters the area of message transmission. However, a receiver in a vehicle passing the message transmitter first and then the trigger transmitter will not be energized until after leaving the area where the message signal is transmitted and so the message will not reach the driver of the vehicle.

The novel features which are believed to be characteristic of the invention are set forth in the appended claims. The invention may best be understood by reference to the following description of one embodiment thereof, taken in conjunction with the accompanying drawings, in which:

Figure 1:
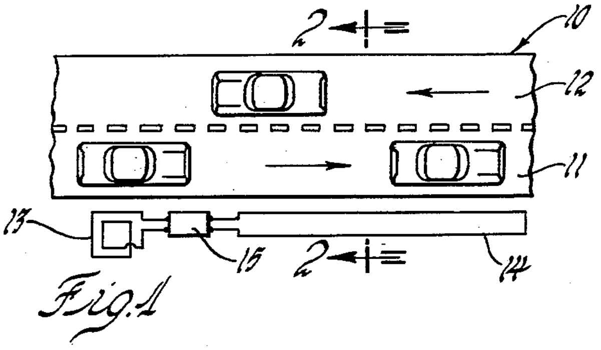
FIGURE 1 is a plan view of a highway communication system employing the invention.
Figure 2:
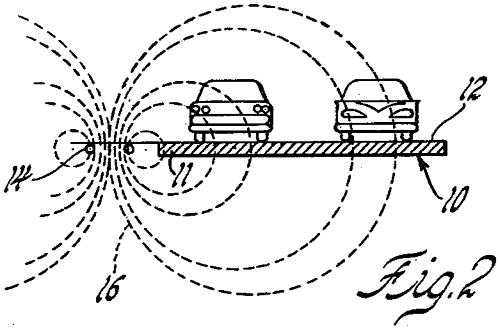
FIGURE 2 is a cross sectional view of the system of FIGURE 1.

Referring now to the drawing, wherein like reference numerals are used to designate like parts in all figures, and referring more particularly to FIGURE 1, a communication system is shown that is effective for transmitting information to vehicles moving along a roadway 10. The roadway includes a lane 11 for vehicles traveling in one direction and a lane 12 for vehicles traveling in the opposite direction as indicated by the arrows. A transmitting system is disposed adjacent the roadway and includes a trigger signal transmitting loop 13 and a message signal transmitting loop 14. Vehicles traveling in the lane 11 first pass the loop 13 and then the loop 14 but vehicles in the other lane 12 first pass the message signal loop 14. A transmitter 15 energizes the transmitting loops 13, 14 with electrical signals that are preferably in the very low frequency range or, more particularly, the range of 10 to 15 kilocycles. Since the lengths of the transmitting loops are very short relative to the wavelength at this frequency, the loops are very inefficient antennae and so very little electromagnetic energy will be propagated therefrom. However, a magnetic field 16 as shown in FIGURE 2 will surround the loop 14 due to the low frequency current flowing therein and a like field will be produced by the loop 13. These magnetic fields will encompass the vehicles traveling along the roadway 10. If the energy of the magnetic field 16 is sufficient to be easily detected by vehicles in the lane 11, then, of course, the field will also be at a high energy level in the lane 12, and so some means must be provided to prevent vehicles in the lane 12 from receiving the transmitted message.

Figure 3:
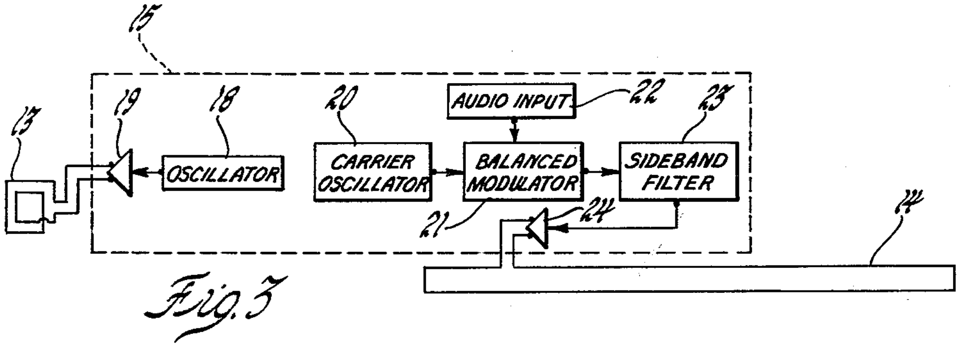
FIGURE 3 is a block diagram of the transmitters employed in the invention.

As shown in FIGURE 3, the transmitter 15 includes two separate transmitting devices. A trigger transmitter for driving the loop 13 includes a constant frequency oscillator 18 which produces a signal at a frequency of 14.1 kilocycles, for example. An amplifier 19, of conventional design, provides adequate power for driving the transmitting loop 13. Also included in the transmitter 15 is a message transmitter adapted to transmit a signal that is modulated with the desired message or information. A single-sideband suppressed-carrier transmitting system is employed. This type of system is the most efficient in terms of the energy level of the magnetic field produced by a given power output. Transistors are used in the transmitters as they are more reliable than vacuum tubes, but since transistors are inherently low power devices, it is necessary to maintain the highest level of efficiency as is possible. A carrier oscillator 20 produces a constant frequency signal of 12.1 kc. to drive a balanced modulator 21. The balanced modulator 21 receives its second input from an audio message source 22. This source 22 may be a microphone or may be a tape recorder which provides a voice message that is continuously repeated. The output of the balanced modulator 21, which is an amplitude-modulated suppressed-carrier signal, is applied to a suitable sideband filter 23 which allows only a portion of the upper sideband to pass through. The filter 23 passes only the band of 12.6 to 13.9 kc. which corresponds to audio frequencies in the band of 500 to 1800 c.p.s. The filtered signal is applied to an amplifier circuit 24 which raises the power level to a value sufficient for driving the transmitting loop 14. The length of the loop 14 is selected such that the passing vehicles will be in the magnetic field of the loop 14 for a length of time sufficient for the desired message to be repeated at least once. If the message units are approximately three seconds long and the vehicles are assumed to be moving at a speed of 60 miles per hour, then the loop 14 must be more than 500 feet long. The loop may be buried in ground adjacent the roadway or may be placed on the surface for temporary installations.

Figure 4:
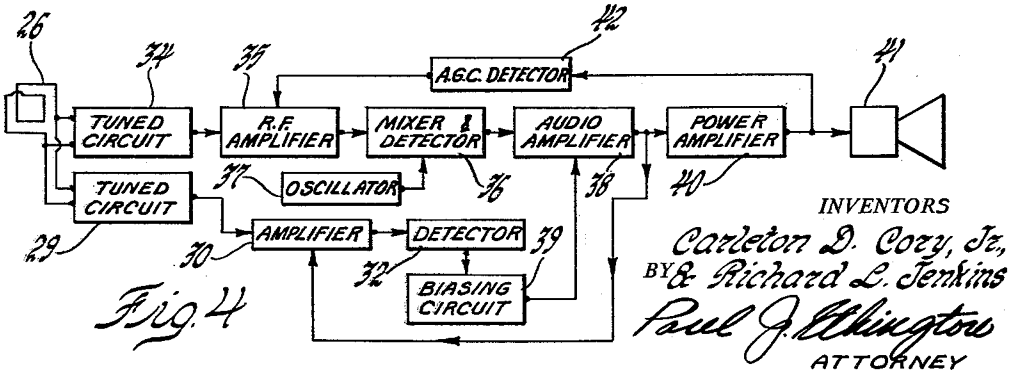
FIGURE 4 is a block diagram of the vehicle-mounted receiver employed in the invention.

With reference to FIGURE 4, there is shown a receiver such as would be installed in each of the vehicles moving along the roadway. This receiver includes an antenna 26 which is responsive to a band that encompasses both the trigger and message signals, that is, from below 12.6 to above 14.1 kc. Connected to the antenna 26 is a first channel that is responsive to the trigger signal transmitted by the loop 13. This first channel includes a tuned circuit 29 that is tuned to the trigger frequency of 14.1 kc. generated by the oscillator 18. The output of the tuned circuit 29 is coupled to a control means including broad band amplifier 30 which, in turn, is coupled to a detector 32. This detector 32 rectifies the trigger signal and produces filtered D.C. output voltage when the vehicle passes the loop 13 and signals of the trigger frequency are imposed upon the tuned circuit 29.

The second channel of the receiver is responsive to the message signal frequency band that is transmitted from the loop 14 and includes a tuned circuit 34 which is of relatively low Q such that it passes the entire band of 12.6 to 13.9 kc. The input of the tuned circuit 34 is connected to the antenna 26 and the output is coupled to an RF amplifier 35 which, in turn, is coupled to a mixer and detector 36. Since suppressed-carrier transmission is used, the carrier must be reinserted and so a signal of the carrier frequency, 12.1 kc., is obtained from a constant frequency oscillator 37 which has an output that is coupled to the mixer and detector 36. The output of the mixer will include the carrier frequency and so this portion of the signal is attenuated by a filter in the output of this stage. The filtered output is applied to an audio driver amplifier 38. An enabling means or biasing circuit 39 is provided for the amplifier 38 such that this amplifier is normally in a non-conductive state. Thus the amplifier 38 is adapted for operation as a gating means and will pass a signal only when enabled or conductive. The output of the amplifier 38 is coupled to an audio power amplifier 40 which, in turn, drives a speaker 41. The output of the detector 32 in the trigger signal channel is applied to the biasing circuit 39 which determines the conductive condition of the audio driver amplifier 38. The audio output signal of the amplifier 38 is coupled back to the input of the amplifier 30 in the trigger channel of the receiver to provide hold-on operation as subsequently described.

Since there is no carrier frequency present in the transmitted signal, the carrier frequency cannot be used to obtain an automatic gain control voltage which is necessary in any radio transmission system. Thus, an AGC signal is taken from the audio power amplifier 40 and developed into a direct voltage proportional to the magnitude of the audio output signal by means of an AGC detector 42. The output of this detector 42 is used to bias at least one stage in the RF amplifier 35.

Figure 5:
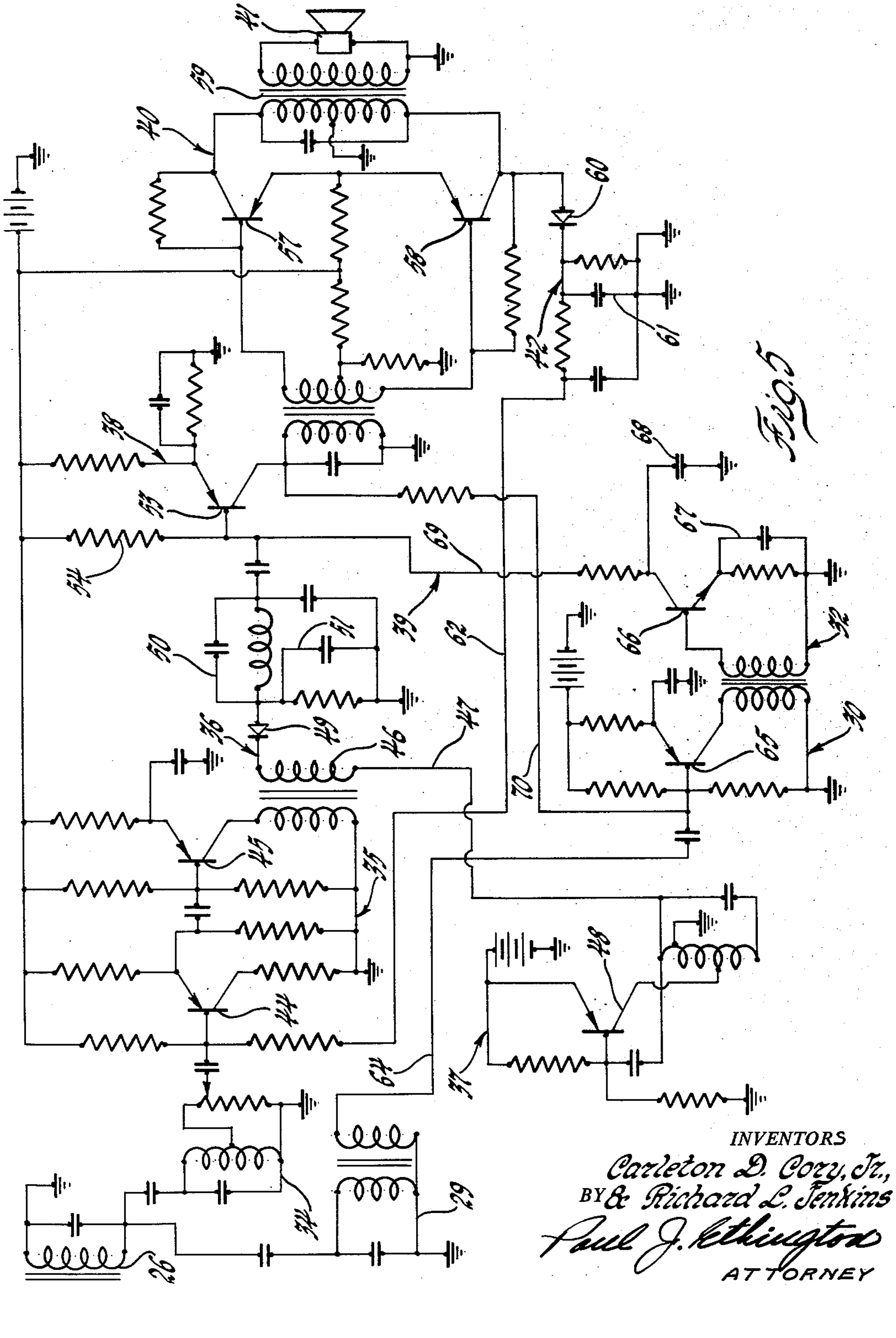
FIGURE 5 is a schematic diagram of the receiver of FIGURE 4.

The receiver of FIGURE 3 is shown in detail in the schematic diagram of FIGURE 5. This vehicle-mounted receiver employs a ferrite core antenna 26 that is responsive to a frequency band including both the trigger and message signals. The antenna is coupled to a tuned circuit 34 which is broadly tuned to the message signal band of 12.6–13.9 kc. but which rejects the trigger signal of 14.1 kc. The output of this tuned circuit is coupled to the RF amplifier 35 which includes two RC coupled amplifier stages utilizing transistor 44 and 45. The output of the second transistor 45 is transformer coupled to the mixer and detector circuit 36 wherein the message signal appears across a secondary winding 46. One terminal of the winding 46 is directly coupled by a conductor 47 to the output of the carrier oscillator 37 which is a constant frequency 12.1 kc. oscillator stage including a transistor 48. The other terminal of the secondary winding 46 is coupled through a mixing diode 49 and a filter circuit which includes a parallel LC filter 50 for carrier frequency rejection and also an RC circuit 51 for detecting the audio modulation signal. The audio signal present at the output of the detector is coupled to the audio driver amplifier 38 which includes a transistor 53. This amplifier also acts as a gating device as the base-emitter circuit is normally reverse biased by means of a voltage divider network in the emitter circuit thereof acting in conjunction with the resistor 54 which forms part of the biasing circuit 39 as described below. The output of the amplifier 38 is transformer coupled to the input of the audio power amplifier 40 which includes the push-pull amplifier circuit employing a pair of transistors 57 and 58. The push-pull output of this power amplifier is coupled by an impedance matching transformer 59 to the speaker 41. The collector of the transistor 58 in the push-pull audio power amplifier is directly coupled to the AGC detector circuit 42 which employs a diode 60 and an RC filter 61. The output of the filter 61 of the AGC detector is directly coupled by a conductor 62 to the base circuit of the transistor 44 in the RF amplifier 35.

The tuned ferrite core antenna 26 is also coupled to the tuned circuit 29 which is sharply resonant at the trigger signal frequency of 14.1 kc. so that it rejects the entire message signal frequency band. The output of the tuned circuit 29 is coupled by a conductor 64 to the input of the broad band or untuned amplifier 30 that includes a transistor 65. The output of this stage is transformer coupled to the detector and amplifier stage 32 which employs a transistor 66. The transistor 66 has an RC filter 67 in the emitter-base circuit and includes a capacitor 68 across the collector output to remove signals of the trigger frequency and provide a D.C. output in accordance with the amplitude of the trigger signal input. A conductor 69 connects the collector of the transistor 66 to the base of the transistor 53 so that the base biasing circuit 39 of the transistor 53 is responsive to the conduction of the transistor 66. The output across the collector load impedance of the transistor 53 is directly coupled through a resistor and a conductor 70 to the input of the transistor 65 so that a portion of the audio output of the driver amplifier 38 will appear at the input of the amplifier 30. This serves to maintain the transistor 66 in its conductive condition after the trigger signal is no longer present across the tuned trigger circuit 29 as hereinafter set forth.

The operation of the system described above will be examined assuming that a receiver as shown in FIGURES 4 and 5 is mounted on a vehicle which is traveling in the lane 11 of the roadway 10 of FIGURE 1. When the vehicle reaches the portion of the roadway adjacent the loop 13, an alternating magnetic field will be encountered having a frequency of 14.1 kc. which is the trigger signal frequency as determined by the oscillator 18. Thus, an alternating voltage will be induced in the antenna 26. This will result in an input signal to the transistor 65 but no signal will appear at the input of the transistor 44 since the tuned circuit 34 excludes the trigger signal frequency. This signal will be effective to drive the transistor 66 into conduction which will, in turn, increase the voltage drop across the resistor 54, allowing the amplifier 38 to be forward biased. The capacitor 68, having been previously charged through the resistor 54 to the D.C. supply voltage, will now discharge through the transistor 66. The forward bias condition of the transistor 53 will be maintained for a few seconds even after the vehicle passes the portion of the road adjacent the loop 13 and out of the magnetic field thereof since the capacitor 68 will charge slowly through the resistance in the biasing circuit 39. When the vehicle enters the portion of the roadway adjacent the loop 14, the alternating magnetic field 16 of the message signal frequency will induce a voltage in the ferrite core antenna 26 corresponding to the single-sideband suppressed-carrier message signal. This signal will be rejected by the tuned circuit 29 but will appear across output of the tuned circuit 34 and so will be amplified by the RF amplifier 35. The message signal appearing at the output of the transistor 45 will not include the carrier of 12.1 kc. but merely the upper sideband of 12.6 to 13.9 kc. and so the carrier will be reinserted in the mixer 36 from the oscillator 37. The modulation envelope of the message signal will thus appear across the output of the detector which includes the diode 49 and the filter 51. Only the audio message will reach the input to the transistor 53 due to the tuned circuit 59 which rejects the carrier frequency. Since the transistor 53 has been forward biased by the conduction of the transistor 66 and discharge of the capacitor 68, the message signal will appear at the input to the power amplifier 40 or on the base electrodes of the transistors 57, 58. Thus, the amplified message signal will drive the speaker 41.

The audio output of the power amplifier 40 is also coupled, from the collector of the transistor 58, to the AGC detector 42. This detector provides a positive direct voltage related to the magnitude of the audio output and this voltage is applied by the conductor 62 to the transistor 44 to reduce the gain thereof in response to the magnitude of the message signal.

The audio output from the driver amplifier 38 or from the collector of the transistor 53 is coupled back by the conductor 70 to the input of the first amplifier 30 in the trigger channel. Since the tuned circuit 29, the selective portion of the trigger channel, is bypassed in this coupling the amplifier and detector 32 will be responsive to the audio message signal. The transistor 66 will then be effective to maintain the forward bias on the transistor 53 such that it will continue to be conductive so long as there is an audio output from this transistor 53.

If the operation of the system described above is examined with the assumption that one of the receivers is located in a vehicle traveling in the lane 12, it can be seen that an audio signal of the message frequency band reaches the receiver prior to the trigger signal. Thus, the transistor 53 will remain reverse biased and no audio output will reach the collector load of the transistor 53. Accordingly, no audio signal will be coupled back by the conductor 70 to the transistor 65 and so the detector stage 66 will not alter the bias of the amplifier 53. The receiver will remain unresponsive to any signals until a signal of the trigger frequency is first applied to the trigger channel which is effective to open the gating means or forward bias the transistor 53. If a message signal is received after a trigger signal, the receiver will remain responsive due to the back coupling by the conductor 70. However, for a vehicle in the lane 12, no message signal will be received after the trigger signal since the vehicle will have passed the region of the field of the loop 14.

While the invention has been described with reference to a particular embodiment, it will of course be understood that the invention is not limited thereto. Various modifications will be apparent to persons skilled in the art, and it is contemplated that the appended claims will cover any such modifications as fall within the true scope of the invention.

We claim:

1. In a system for transmitting information to a moving vehicle, first transmitting means positioned adjacent the path of movement of said vehicle and adapted to transmit a trigger signal of a given frequency, second transmitting means positioned adjacent said path and adapted to transmit an information signal over a frequency band not including said given frequency, vehicle-mounted receiving means including first frequency selective means responsive to said given frequency and second frequency selective means responsive to said frequency band, signal utilization means included in said receiving means, gating means connected in circuit between the output of said second frequency selective means and said signal utilization means, control means connected to the first frequency selective means and adapted to develop a control signal in response to trigger signals appearing at the output of said first frequency selective means, enabling means connected between the control means and the gating means and adapted to enable said gating means to allow signals appearing at the output to pass signals from said second frequency selective means to said signal utilization means only when a control signal is applied to the enabling means, and means for coupling the output of said gating means to the input of said control means whereby a control signal is applied to the enabling means in response to the information signal after the trigger signal has ceased.

2. In a system for transmitting information to a moving vehicle that is traveling in a given direction on a path of movement, first transmitting means positioned adjacent the path of movement of said vehicle and adapted to transmit a trigger signal of a given frequency, second transmitting means positioned adjacent said path and adapted to transmit an information signal over a frequency band not including said given frequency, vehicle-mounted receiving means including a first tuned circuit adapted to be responsive to said given frequency and a second tuned circuit adapted to be responsive to said frequency band, signal utilization means included in said receiving means, gating means connected in circuit between the output of said second tuned circuit and the input of said signal utilization means and adapted to be enabled by signals appearing at the output of said first tuned circuit, said gating means being effective to allow signals appearing at the output of said second tuned circuit to reach said signal utilization means only when enabled, and time delay means connected with said gating means and adapted to maintain said gating means enabled for a given time after signals at the output of said first tuned circuit have ceased, said given time corresponding to the time required by said vehicle to move from a position adjacent said first transmitting means to a position adjacent said second transmitting means.

3. A receiver adapted to be responsive to a message signal in a given frequency band after receipt of a trigger signal having a predetermined frequency outside said given frequency band, said receiver comprising antenna means, first frequency selective means connected to said antenna means and responsive only to said predetermined frequency, second frequency selective means connected to said antenna means and responsive only to said frequency band, utilization means adapted to be responsive to said message signal, gating means having an input connected to said second frequency selective means and an output connected to said utilization means, said gating means being effective to allow said message signal to reach said utilization means only when enabled, enabling means having an input connected to said first frequency selective means and being effective to enable said gating means upon the receipt of said trigger signal, coupling means connecting the output of said gating means to the input of said enabling means whereby after being initially enabled said gating means will remain enabled as long as said message signal is present at the output thereof, and time delay means included in said enabling means and effective to maintain said gating means in an enabled condition for a period of time after receipt of said trigger signal has ceased.

References Cited in the file of this patent

UNITED STATES PATENTS

| | | |
|---|---|---|
| 2,429,607 | Capen | Oct. 28, 1947 |
| 2,484,680 | Bossart | Oct. 11, 1949 |
| 2,501,091 | Preston | Mar. 21, 1950 |
| 2,542,803 | Evans et al. | Feb. 20, 1951 |
| 2,790,071 | Gunn | Apr. 23, 1957 |
| 2,935,572 | Hastings et al. | May 3, 1960 |
| 2,966,659 | Dahlbom et al. | Dec. 27, 1960 |
| 2,980,794 | Hargreaves et al. | Apr. 18, 1961 |